United States Patent
Tamai

[11] Patent Number: 5,960,479
[45] Date of Patent: Oct. 5, 1999

[54] PAD AND MANUFACTURING METHOD THEREOF

[75] Inventor: Yoshio Tamai, Tamano, Japan

[73] Assignee: Teikoku Co., Ltd., Okayama, Japan

[21] Appl. No.: 08/817,431

[22] PCT Filed: May 2, 1996

[86] PCT No.: PCT/JP96/01231

§ 371 Date: Apr. 14, 1997

§ 102(e) Date: Apr. 14, 1997

[87] PCT Pub. No.: WO97/07699

PCT Pub. Date: Mar. 6, 1997

[30] Foreign Application Priority Data

Aug. 22, 1995 [JP] Japan .................................. 7-237811
Aug. 23, 1995 [JP] Japan .................................. 7-009817 U

[51] Int. Cl.⁶ .................................................. A41D 27/26
[52] U.S. Cl. ........................ 2/268; 2/455; 2/459; 2/461; 2/243.1
[58] Field of Search ............................... 2/455, 456, 461, 2/459, 460, 46, 2.5, 267, 268, 457, 458, 400, 462, 463, 464, 465, 466, 467, 243.1, 20, 22, 23, 24

[56] References Cited

U.S. PATENT DOCUMENTS

| | | | |
|---|---|---|---|
| 2,410,986 | 11/1946 | Merchur | 2/268 |
| 2,424,482 | 7/1947 | Merchur et al. | 2/268 |
| 2,478,340 | 8/1949 | Talalay | 2/268 |
| 2,523,720 | 9/1950 | Riedler et al. | 2/268 |
| 2,616,093 | 11/1952 | Talalay | 2/268 |
| 2,637,854 | 5/1953 | Riedler et al. | 2/268 |

FOREIGN PATENT DOCUMENTS

| | | |
|---|---|---|
| 63-11519 | 1/1988 | Japan. |
| 437217 | 3/1992 | Japan. |
| 81812 | 3/1996 | Japan. |

*Primary Examiner*—Jeanette E. Chapman
*Attorney, Agent, or Firm*—Birch, Stewart, Kolasch & Birch, LLP

[57] ABSTRACT

This invention provides a pad for clothes, such as a shoulder pad, and a manufacturing method thereof, wherein the precise positioning of a shape memory material is maintained, while the safety of a pad is improved. A shape memory material is contained in a pouch-like body, and the pouch-like body is positioned in the pad materials. In the pouch-like body, the precise positioning of the shape memory material is achieved by forming an opening and by providing a positioning part. The shape memory material is inserted into the opening and is positioned adjacent to the positioning part.

15 Claims, 8 Drawing Sheets

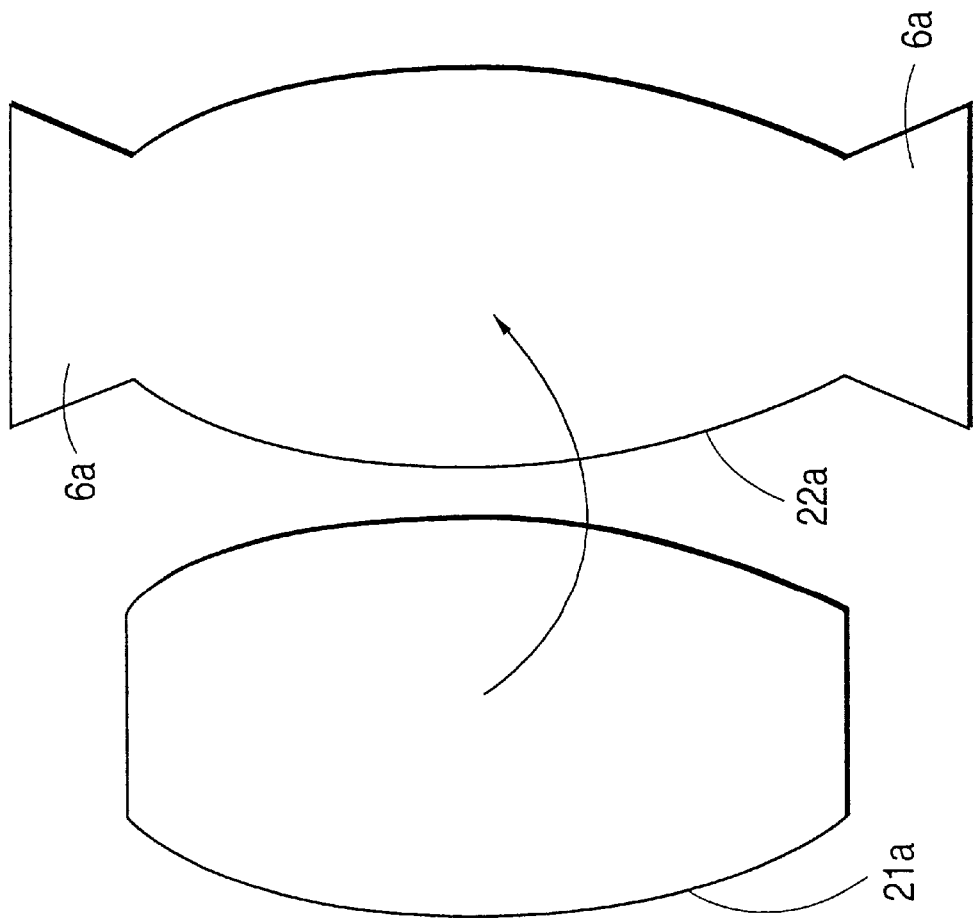
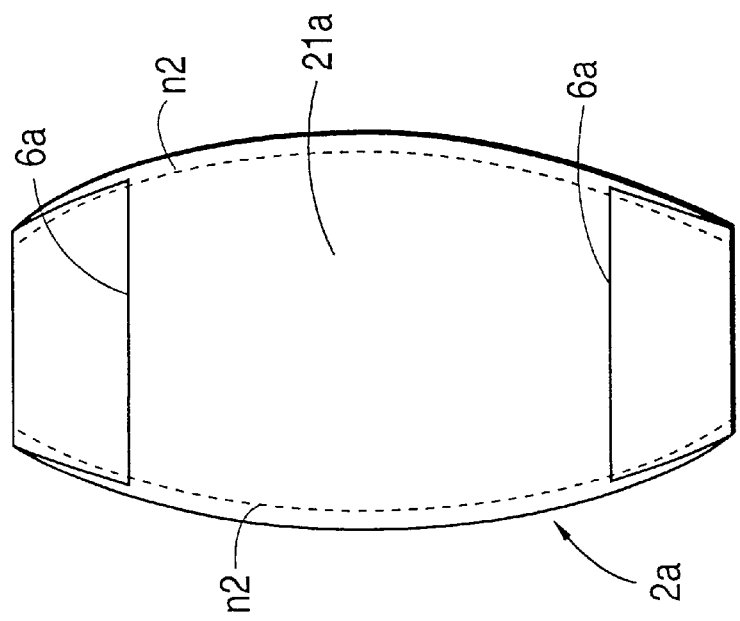
FIG. 7(B)
FIG. 7(A)

PAD AND MANUFACTURING METHOD THEREOF

TECHNICAL FIELD

This invention relates to a pad for clothes, such as a shoulder pad, and a manufacturing method of the pad.

BACKGROUND ART

Conventionally, a pad for clothes, such as a shoulder pad, has been improved by positioning a shape memory material, such as a shape memory alloy or a shape memory resin, to enhance pad retentivity. Particularly, this type of pad has an advantage of keeping a good shape of the pad. For example, a pad changes shape when the pad contacts the wearer who has a body temperature which leads to rise the temperature of the pad to a thermal expansion temperature. The memory material maintains the shape of the pad even after the shape of the pad has changed with storage for a long time or with a wash of clothes.

For example, Japanese Utility Model Laid-Open Publication No. 63-11591 (11519/1988) discloses a shoulder pad wherein a linear material made of a shape memory alloy is inserted into and passed through an inner part where a plurality of flexible pad materials including a fiber material are overlapped. The conventional shoulder pad is made as follows: a thin, cylindrical hollow part is pre-formed within an inner part close to one tip of the pad (to a shoulder); and a linear material made of a shape memory material is passed through one open end of the hollow part to the other end (the leading end of the material is first inserted). However, the shape of the shoulder pad itself is three-dimensionally curved, and the linear material made of a shape memory material is also curved. Therefore, the insertion and passage require a lot of manufacturing time; and the leading end of the linear material made of a shape memory material may protrude and break clothes, or it may injure people in the worst case, unless an open end of the hollow part is closed after insertion and passage.

Japanese Utility Model Laid-Open Publication No. 4-37217 (37217/1992) discloses a shoulder pad wherein a flexible pad material including a fiber material is folded in two, then a linear material made of a shape memory alloy or a net made of a shape memory alloy is positioned along the crease. Although the workability for manufacturing this pad has been improved, because the pad material is folded in two parts to put a shape memory material within the pad, as the shape memory material is positioned along the crease, the position of shape memory material is limited on the crease, and the degree of freedom tends to be less. In particular, in this pad, the crease can be a tip of the pad (a tip of a shoulder); the shape memory material is always positioned along a tip of a shoulder; if the shape memory material is desired to be positioned along a inner side by a certain distance from a tip of a shoulder, it is very difficult to position the material, and the workability worsens. Unless an open end of a hollow part after insertion and passage is closed, a leading end of a linear material made of the shape memory material may protrude to damage clothes or to injure people.

SUMMARY OF THE INVENTION

The present invention is directed to overcome the problems of conventional pads, in particular, to provide a pad, wherein the precise positioning is obtained by positioning a curved shape memory material within a curved pad, while obtaining good workability. Another aspect of the present invention is directed to prevent a shape memory material from protruding through clothes to improve the safety of pad. A further aspect of the present invention is to provide a method of manufacturing a pad which may achieve the purposes described above and which also has a very high workability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DISCLOSURE OF THE INVENTION

The first invention provides a pad in which a shape memory material 3 is positioned within flexible pad materials 11, 12, 13, 14, 15, such as a fiber material, wherein a pouch-like body 2 containing a shape memory material 3 is positioned with the other pads materials 11, 12, 13, 14, 15.

The second invention is to provide a pad according to the first invention, wherein a pouch-like body 2 comprises at least two pieces of sheet-like bodies 21 and 22, which are connected to each other to form a positioning part 5, along which the shape memory material 3 is positioned.

However, at least two pieces of sheet-like bodies 21 and 22 may be counted as two pieces by folding one sheet-like body in two. Therefore, the connection between two pieces of sheet-like bodies 21 and 22 may be made by sewing or bonding, but the bodies may be considered to be connected by the creased line of the two-folded sheet-like body described above: the positioning part 5 may be formed entirely or partially by the creased line.

Thus, in the first and second invention, as the shape memory material 3 is contained in a pouch-like body 2, the workability is good, and the positioning is easy and certain: the pouch-like body 2 is precisely positioned in a given position, whereby the shape memory material 3 is also precisely positioned in a given position. If the shape memory material is a long continuous material including a linear material, the shape memory material can be easily and precisely positioned by containing the material within the pouch-like body 2.

The third invention is to provide a pad according to the first or second invention, wherein the pouch-like body 2 has an opening 4 for inserting the long continuous shape memory material 3 therethrough. The opening 4 is formed in place within the pouch-like body 2.

The fourth invention is to provide a pad according to the first or second invention, wherein the pouch-like body 2 has an opening 4 which opens along a longitudinal direction of the long continuous shape memory material 3. The opening 4 opens at an end surface of the pad, so that the shape memory material 3 is inserted into and positioned within the pouch-like body 2 from the opening 4.

In the third invention, as the opening 4 is provided in a pouch-like body 2, the shape memory material 3 can be positioned within the pouch-like body 2 by inserting the shape memory material 3 from the opening 4. As the opening 4 is provided at a predetermined position, a tip of the long continuous shape memory material 3 cannot accidentally protrude from the opening 4 in putting on clothes with pads.

Especially, in the fourth invention, as the opening 4 is formed along the longitudinal direction of the long continuous shape memory material 3, the opening 4 can be widely opened, and the shape memory material 3 can be smoothly inserted into the opening 4, even if the shape memory material 3 is curved and continuously long. In this case, if the length of the opening 4 is equal to or longer than the length of the long continuous shape memory material 3, the shape memory material 3 can be very smoothly inserted into the opening 4 without force. However, the length of the opening 4 has no problems in practice, even if the length of the opening is shorter than the shape memory material 3, or when the shape memory material 3 is distorted or curved, or when the shape memory material 3 has a length that requires the shape memory material 3 to be inclinedly inserted. Then, in this insertion, the shape memory material 3 can be inserted so that the shape memory material 3 can reach the back of the pouch-like body 2 (the bottom), whereby the shape memory material 3 is naturally positioned along the positioning part 5 with only one motion, such as a push of the shape memory material 3.

However, the opening 4 may be completely closed in the finished end of the pad, but, even if the opening 4 is not completely closed, the pad can maintain safety, because the opening 4 is not on the line extending from the ends of the long continuous shape memory material 3.

The fifth invention provides a pad according to the third or fourth invention, wherein the pad has the higher stability, because the shape memory material 3 is fixed in the pad by a fixing means, such as sewing, after the shape memory material is inserted through the opening 4 within the pad, and is positioned along the positioning part 5 naturally.

The sixth invention provides a pad according to each invention described above, wherein the part on the line extending from the longitudinal direction of the long continuous shape memory material 3 of the pouch-like body 2 is closed to form protrusion-preventing parts 6, 6.

The seventh invention provides a pad according to the sixth invention, wherein the part on the line extending from the longitudinal direction of the long continuous shape memory material 3 of the pouch-like pad 2 is closed to form protrusion-preventing parts 6, 6. The protrusion-preventing parts 6, 6 are formed so that two pieces of sheet-like bodies 21 and 22 can be connected to each other, while at least one of the two pieces of sheet-like bodies, is folded back to be overlapped on the other sheet-like body. Each sheet-like body is positioned either over or under the shape memory material.

In the sixth and seventh invention, as the part on the line extending from the longitudinal end of the long continuous shape memory material 3 is closed, the end of the long continuous memory material 3 can be prevented from protruding from the pad. Especially, in the seventh invention, the protrusion-preventing parts 6, 6 are formed by connecting sheet-like bodies 21, 22 to each other. At least one of two pieces of sheet-like bodies (each body is positioned over or under the shape memory material 3) is folded back to overlap the other sheet-like body. The protrusion-preventing parts 6, 6 will be made by the folded sheet-like bodies 21, 22, whereby it is very difficult for the end of the shape memory material 3 to protrude. Therefore, the safety of the pad can be further improved.

The eighth invention provides a pad having a shape memory material 3 from the front to the back of the shoulder k of Western clothes and an opening 4 from the front to the back of the shoulder k along an edge of the shoulder tip k1 of the shoulder pad. At the back of the opening 4, a positioning part 5 is formed, which positions the shape memory material 3. The positioning part 5 is formed by connecting the pad materials 21 and 22 (each pad material is over or under the shape memory material 3) and is positioned along the positioning part 5 after insertion from the opening 4.

As the pad of the eighth invention is formed along an edge of the side of the shoulder tip k1 of the shoulder pad, the shape memory material 3 from the front to the back of the shoulder k can be smoothly inserted inside. When inserting, the length of the opening 4 should be equal to or longer than the length of the long continuous shape memory material 3. However, even if the length of the opening 4 is shorter than the length of the long continuous shape memory material 3, when the shape material 3 is curved or distorted, or when the shape memory material 3 has a length which the shape memory material 3 is inclinedly inserted, there are no problems in positioning the shape memory material 3. Moreover, as the positioning part 5, which defines the position of the shape memory material 3, is formed at the back of the opening 4, the shape memory material 3 is naturally positioned along the positioning part 5 by inserting the shape memory material 3 to reach the back, so that only a motion, such as a push of the shape memory material 3, completes the positioning.

The ninth invention provides a pad according to the eight invention, wherein the protrusion-preventing parts 6, 6 are formed at the both ends of the positioning part 5. The protrusion-preventing part 6, 6 is formed by connecting the pad materials 21, 22 each other, while at least one of two pad materials 21, 22, over and under the shape memory material 3. The shape memory material 3 is inserted between two pad materials 21, 22 over and under the shape memory material 3 through the opening 4 opened, positioned along the positioning part 5, and put between the protrusion-preventing part 6, 6 described above.

In the ninth invention, as the pad has protrusion-preventing part 6, 6 formed by overlapping after at least one of two pad materials 21, 22 is folded back, the protrusion of the shape memory material 3 is positively prevented. In addition, as the shape memory material 3 is positioned along the positioning part 5, and put between the protrusion-preventing parts 6, 6 described above, the stability of the shape memory material 3 in the pad will be improved.

The tenth invention provides a manufacturing method of a pad in which a long continuous shape memory material is positioned in a flexible pad material including a fiber material, as follows. First, continuous pad materials 11a, 12a, 13a, 14a, 15a are joined together to form two pads in right and left sides, each having a continuous pouch-like body 2d. The two pouch-like pads in right and left sides are overlapped. Secondly the continuous pad material 11a, 12a, 13a, 14a, 15a and the continuous pouch-like body 2a are cut to position the two pad members in right and left sides. Therefore, the pad member provides a pouch-like body 2, of which an edge cut during the process described above opens and gives an opening 4, and of which the other edge gives a positioning part 5 which has been closed, so that each pouch-like body 2 of each pad member can be arranged with another pad material 11, 12, 13, 14, 15. Then the pad is manufactured so that the shape memory material 3 can be inserted from the opening 4 of a pouch-like body of each pad member to be along the positioning part 5.

In the tenth invention, by cutting the continuous pad materials 11a, 12a, 13a, 14a, 15a and the continuous pouch-like body 2a into two right and left pieces, not only two pads can be simultaneously manufactured, but also the pouch-like body 2 having the opening 4 with an adequate length can be obtained. By inserting the shape memory material 3 into the pouch-like body 2, a pad having the shape memory material 3 can be easily manufactured.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 7 (A) is a plan view of a pouch-like body of the pad,

FIG. 7 (B) is a plan view wherein the pouch-like body is decomposed.

FIG. 8 (B) is a side view wherein each material of the pad is adhesively formed, FIG. 8 (C) is a plan view showing the pad cut.

BEST MODE FOR CARRYING OUT THE INVENTION

Now, referring to the embodiments of the present invention according to the drawings.

Figure 1:
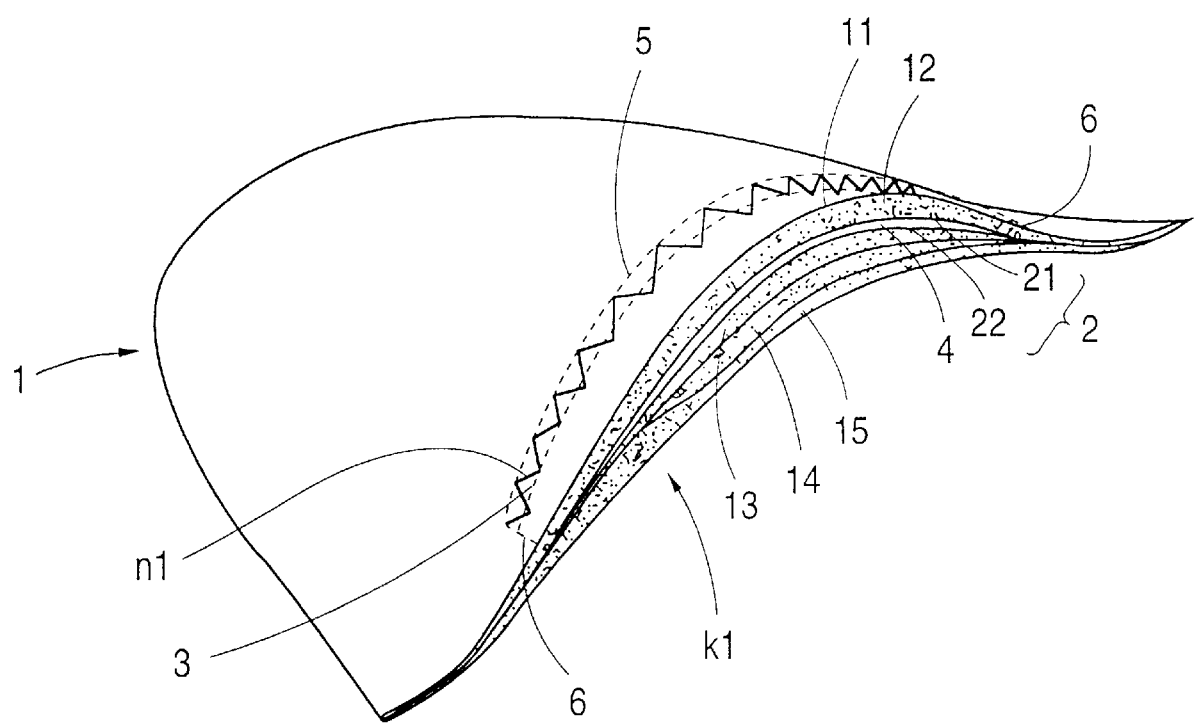
FIG. 1 is a perspective view of a pad of a first embodiment of the present invention.
Figure 2:
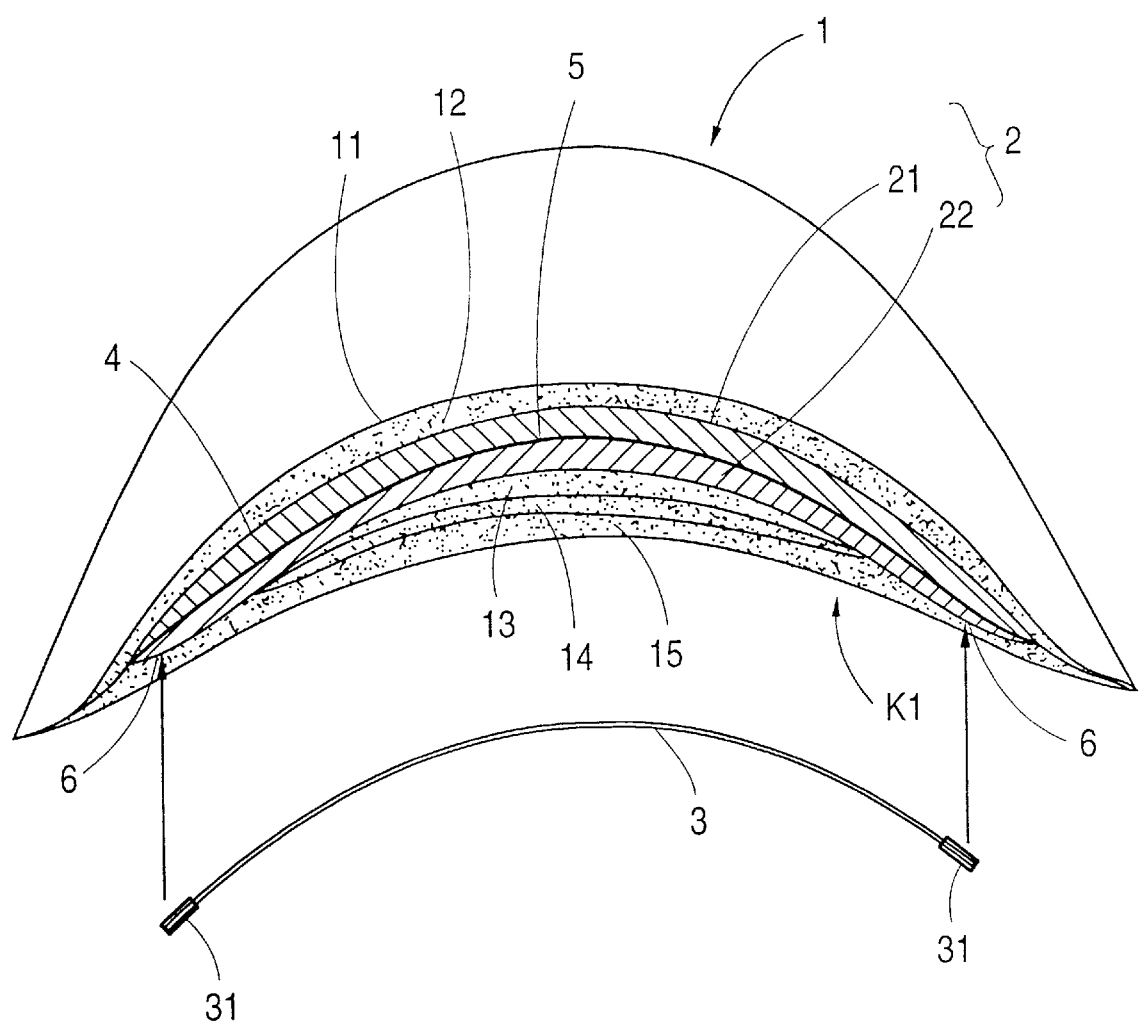
FIG. 2 is a perspective view of the pad wherein an opening is opened.
Figure 3A:
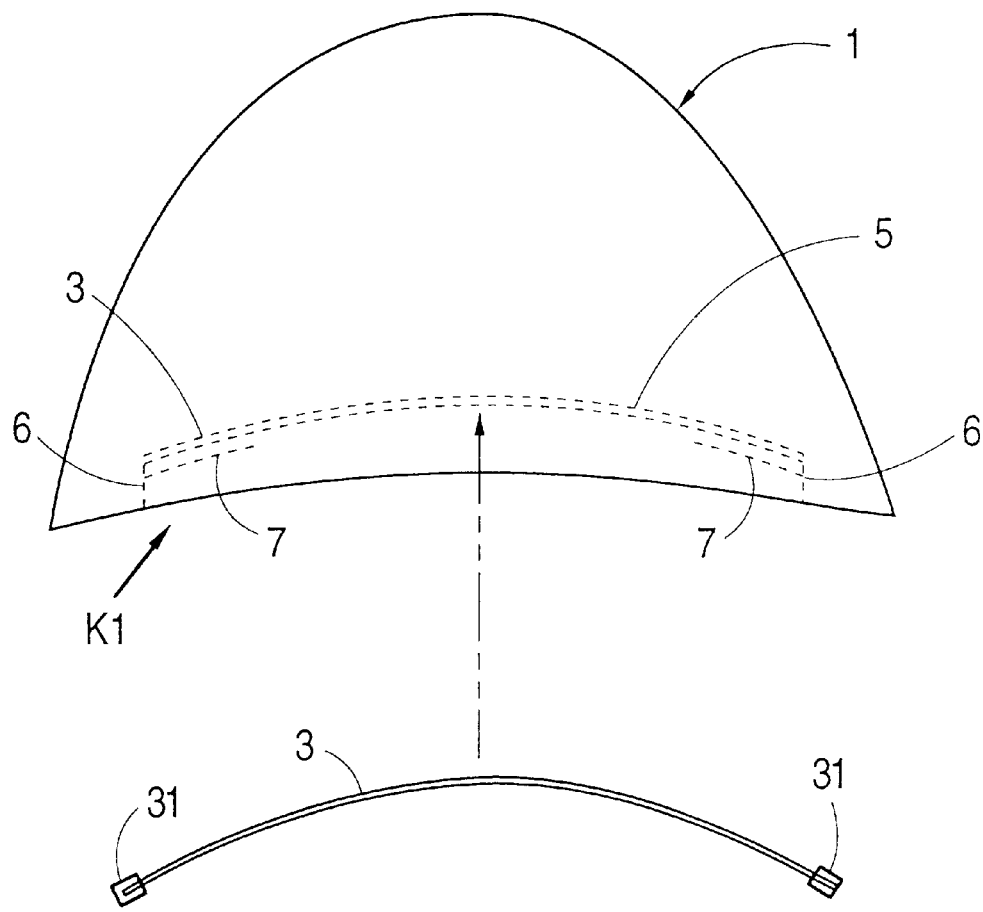
FIG. 3 (A) is a plan view of the pad, and FIG. 3 (B) is a front view.
Figure 3B:
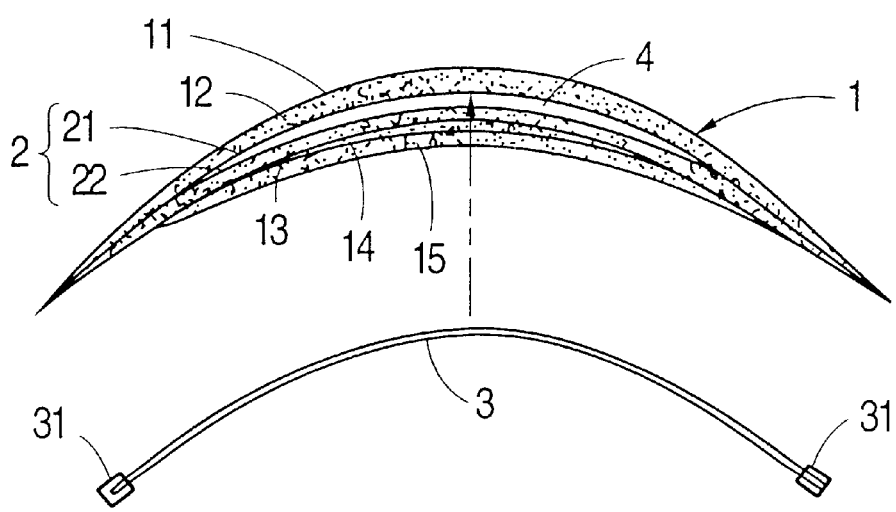
Figure 4:
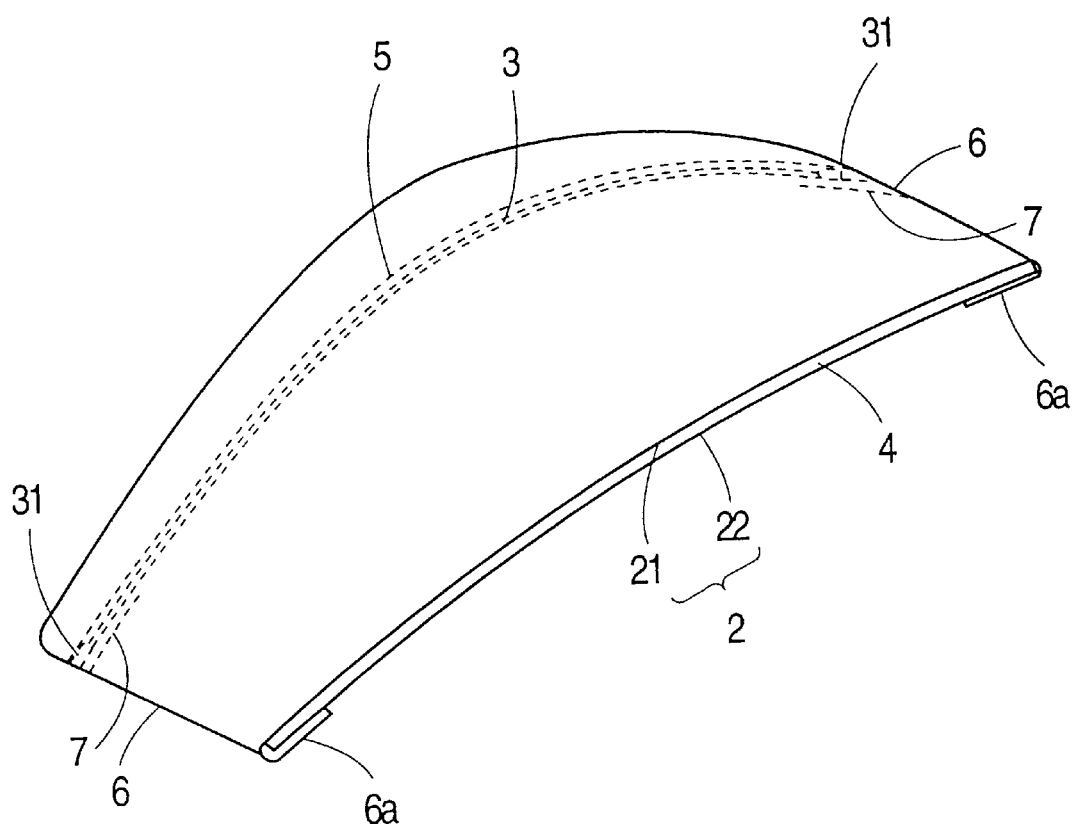
FIG. 4 is a perspective view of a pouch-like body of the pad.

FIG. 1 is a perspective view of a pad according to an embodiment of the present invention, while FIG. 2 is a perspective view wherein the opening of the pad is open. FIG. 3 (A) is a plan view of the pad, FIG. 3 (B) is a front view. FIG. 4 is a perspective view of a pouch-like body of the pad, while FIG. 5 is an illustrative view of a position which the pad is used.

Figure 5:
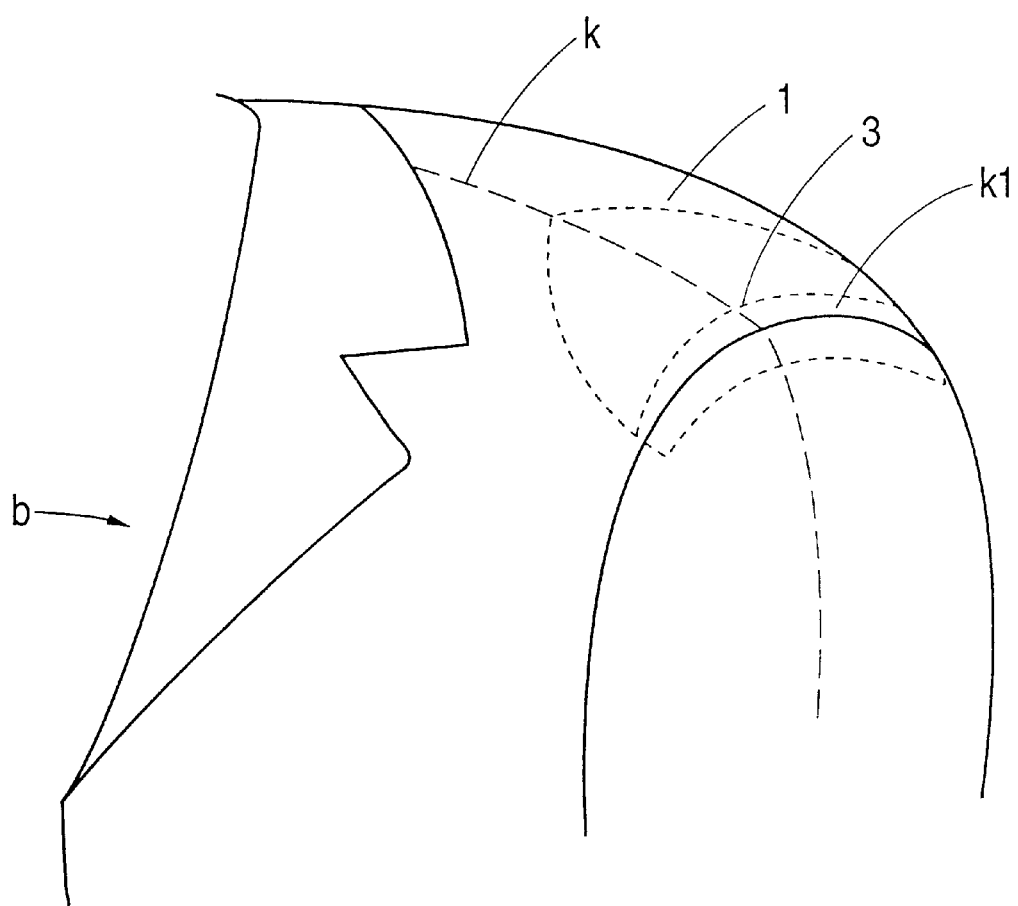
FIG. 5 is a illustrative view showing a position for using the pad.
Figure 6A:
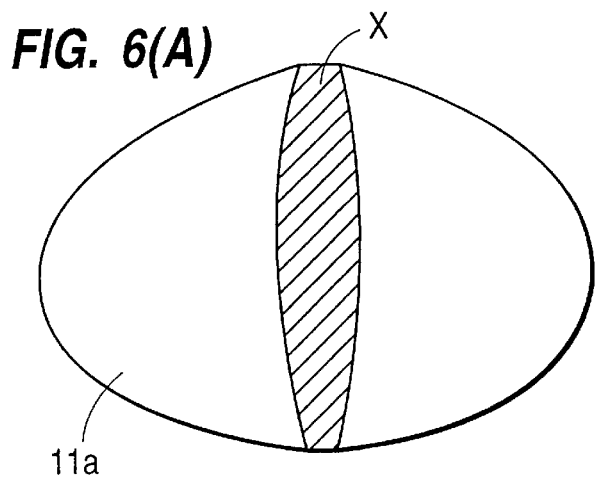
FIGS. 6(A)–(F), hereinafter referred to as FIG. 6, are illustrative views.
Figure 6B:
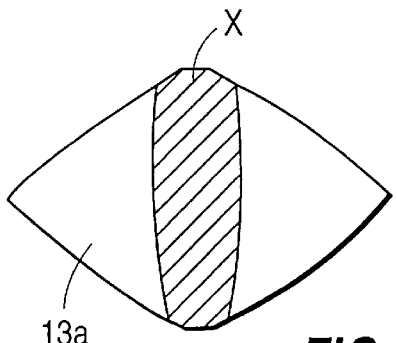
Figure 6C:
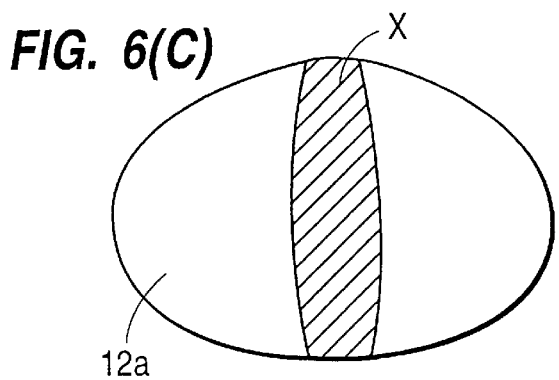
Figure 6D:
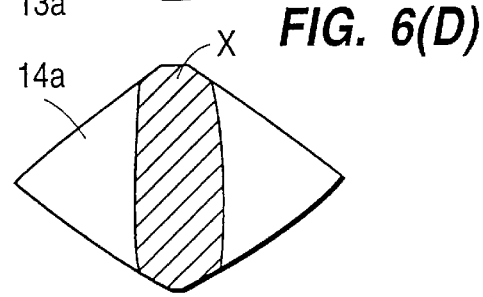
Figure 6E:
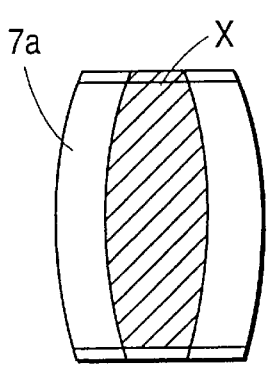
Figure 6F:
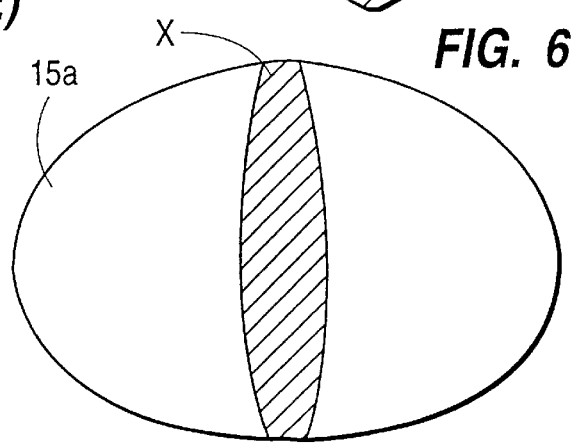

The pad 1 is a shoulder pad for various clothes, such as formal clothes including a blazer and a school uniform, or such as casual clothes including a dress and a blouse, as shown in FIG. 5. The pad 1 is sewn in the upper side of a shoulder k of a blazer b similar to a typical pad. The pad 1 is curved so that it can extend from the front to the back of the shoulder (from the front surface to the back surface) giving the upper side of the shoulder of clothes the center. Similar to a typical shoulder pad, the thickness of the side of shoulder tip (the boundary between the shoulder and arm) is greater, getting thinner towards the wearer's neck. In this pad 1, a shape memory material 3 extending over the front and the back of the shoulder is positioned at an inner part closer to the shoulder tip.

In the shoulder pad 1, as shown in FIGS. 1–3, the shape memory material 3 is positioned within layers which flexible pad materials 11, 12, 13, 14, and 15, such as fiber material, are overlapped. Non-woven fabrics, textures, knits, cottons, and flexible synthetic resins including urethane can be used as the pad material. In this embodiment, although a plurality of layers of pad materials 11, 12, 13, 14, and 15 are overlapped to make the pad, the number of pieces to be overlapped can be changed. For example, only one sponge-like pad member may be used to position the shape memory material. However, in this figure, the outside pad material 11 is shown with a thickness "line" as respectively thinner non-woven fabrics or textures used.

For the shape memory material 3, shape memory alloys or shape memory resins are used, and the shape memory material can be one or plural linear, in net, in knit, or in texture, which is a surface shape memory material have an approximate area equal to that of another pad material. The suitable shape memory materials can recover its memorized shape according to a temperature approximately equal to the wearer's body temperature. Shape memory materials, which show a given shape, may be adopted depending on wearing or drying after washing. In this embodiment, one linear material made of shape memory material is used. According to changes of the shape, the entire shape of the pad can be molded to a desired shape.

The shape memory material 3 is inserted from the opening 4 provided at the end surface of the shoulder tip k1 of the shoulder pad 1, into the shoulder pad 1. That is, the opening 4 is formed along an edge of the side of the shoulder tip k1 of the pad to extend forward and backward relative to the shoulder. The positioning part 5, which defines a position of the shape memory material 3, is formed at the back of the opening (an appropriate position into the neck side from the shoulder tip of the shoulder pad). The positioning part 5 is formed by closing two pieces of sheet-like bodies 21, 22. However, the sheet-like bodies are thin and are represented as a "line" in the figure. The way to close is to fix two pieces of sheet-like bodies 21, 22 by bonding or sewing or with metal fasteners. The fixation may be conducted in continuously linear, or some points of the bodies 21, 22 may be fixed intermittently. In short, the fixation should prevent the shape memory material 3 from proceeding to the position deeper than the position where the shape memory material is fixed, so that the sheet-like bodies may contact on the shape memory material 3.

In this embodiment, the sheet-like bodies 21, 22 forming the opening 4 are used as pouch-like body 2. As the pouch-like body material, a sheet-like pad material as flexible as another pad material 11, 12, 13, 14, and 15 is used. More preferably, smooth woven fabrics like thick cloth such as sailcloth or denims may be used, but thinner cloth also may be used. Woven forms and threads can be freely changed. The pouch-like body 2 may be overlapped in two or three or more layers.

The pouch-like body 2 is a pouch having a bottom, wherein one of longer opposite edges opens to provide the opening 4, while the other end of longer opposite edge is closed to provide the positioning part 5. The protrusion-preventing part 6, 6 is formed by closing two opposite shorter edges, so that the shape memory material 3 can not protrude toward its front or back direction. That is, when the opening 4 is regarded as a mouth of a pouch, and the positioning part 5 is regarded as a bottom of the pouch, this protrusion-preventing parts 6, 6 are to be positioned at the sides of the pouch. Although the sides of the pouch are not required to close, by closing the sides, the sides are utilized for a protrusion-preventing parts 6, 6.

The shape memory material 3 is inserted from the opening 4. When inserting, the opening 4 can be opened widely as shown in FIG. 2. So the shape memory material 3 can be very easily inserted through the opening 4 widely opened to the deeper site from the shoulder tip k1. When the shape memory material 3 is inserted until the shape memory material 3 touches the positioning part 5 at the back, the position of the shape memory material is determined naturally. That is, the shape memory material 3 will positioned along the positioning part 5, in other words the shape memory material 3 is adjacent to the positioning part 5. In particular, as shown in FIG. 3, the shape memory material 3 is curved, when seen from top or front. Although it was very difficult to precisely position the dimensionally curved shape memory material 3 to insert with good workability, if the opening 4 open through the approximately entire length of the shape memory material is widely opened from the front to the back of the shoulder to the shoulder tip k1, the shape memory material 3 can be easily inserted. In addition, only if the shape memory material 3 is inserted to touch the positioning part 5 at the back, the precise positioning can be conducted. However, one piece of the sheet-like body 2 can be folded in two to form the pouch-like body. In this case, the crease showing the sheet-like body folded in two will be the bottom of the pouch, that is, the positioning part 5. However, as described, it is more advantageous to form the positioning part 5 by means of the fixation including sewing and bonding in that the positioning part 5 can be formed corresponding to the shape of the curved shape memory material 3.

Furthermore, by the protrusion-preventing parts 6,6, the positions of the ends of the shape memory material 3 are designed to touch the protrusion-preventing parts 6,6 with only insertion until the shape memory material 3 is touching the positioning part 5 at the back, while the forward and backward positions of the shoulder can be simultaneously and precisely determined. In addition, the forward and backward ends of the shape memory material 3 can be prevented from protruding, because the protrusion-preventing parts 6, 6 touches the forward and backward ends of the shape memory material 3, even when the shape memory material 3 tries to move in wearing, so that the risks of injuring clothes or people will be eliminated. However, in this embodiment, the safety in accidental protrusions is enhanced by attaching caps 31, 31 made of synthetic resins at the forward and backward ends of the shape memory material 3.

Although the inserted shape memory material 3 can remain, as shown in FIG. 1, it can be fixed with the thread n1 by sewing with a sewing machine. The sewing in the pouch-like body 2 can be positioned closer to the shoulder tip from the shape memory material so that the shape memory material 3 can be fixed between the sewn part and the positioning part 5. As shown in FIG. 1, the shape memory material can be centered and sewn to fix the thread n1 with zigzagging. By another means such as bonding, the fixation of the shape memory material 3 can be designed with fixation in place between the two sheet-like bodies 21, 22 of the pouch-like body 2. However, fixation by sewing or bonding can be entirely conducted over the sheet-like material 21, 22. That is, while the shape memory material 3 is positioned on the position part 5, two sheet-like bodies 21, 22 of the pouch-like body 2 can be joined to each other to close the opening 4.

As this shoulder pad 1 is sewn in the shoulder of clothes, as in conventional shoulder pads, when sewing, if the shape memory material 3 is precisely defined, the needle for sewing cannot touch the shape memory material, whereby a break of the needle can be prevented.

Now a method for manufacturing a pad will be described. First, continuous pad materials 11a, 12a, 13a, 14a, and 15a forming a symmetrical pair each with a continuous pouch-like body 2a are prepared. The shoulder pad 1 is formed by overlapping a plural of layers of approximately half-oval pad materials 11, 12, 13, 14, and 15. Thus, pad materials 11, 12, 13, 14, and 15, with a half-oval shape, which form the layers, are respectively symmetrically connected to provide a single, approximately oval continuous pad material 11a, 12a, 13a, 14a, and 14a respectively (see FIG. 6). As the continuous pad materials are overlapped to make several layers, the shape, size, thickness, or quality can be changed depending on each layer as in the conventional shoulder pad.

The continuous pouch-like body 2a has an approximately oval shape with a combination of two approximately half-oval pouch-like bodies 2, where each body faces each other. In particular, as shown in FIG. 7, the continuous pouch-like body 2a is respectively composed of single continuous sheet-like bodies 21a, 22a which oppose each other, with two sheet-like bodies 21, 22 comprising the sheet-like body 2 described above. Although both continuous sheet-like bodies 21a, 22a have the approximately same shape, one of the continuous sheet-like bodies 22a is formed forward and backward longer than the other continuous sheet-like body 21a. The forward and backward extending parts are given as the folded-back parts 6a, 6a. Continuous sheet-like materials 21a, 22a overlap each other, and the folded-back parts 6a, 6a are folded back to the surface of one of the continuous sheet-like materials 21a. The folded-back parts 6a, 6a cause the end of the pouch to be closed, whereby the protrusion-preventing part 6 of the complete pouch-like body 2 is formed. However, in this figure, although only one of the continuous sheet-like bodies 21a is provided with the folded-back part, both of two sheet-like bodies can be folded back. Then at the both sides of the overlapped continuous sheet-like materials 21a, 22a, the positioning part 5 described above is formed by sewing with the thread n2. However, although the folded-back parts 6a, 6a may be sewn on with the thread n2, only folding back facilitates good fixing. The positioning part 5 as well as the protrusion preventing part 6 can be formed by providing a crease. Instead of sewing, another means for attaching including bonding can be utilized.

Figure 8A:
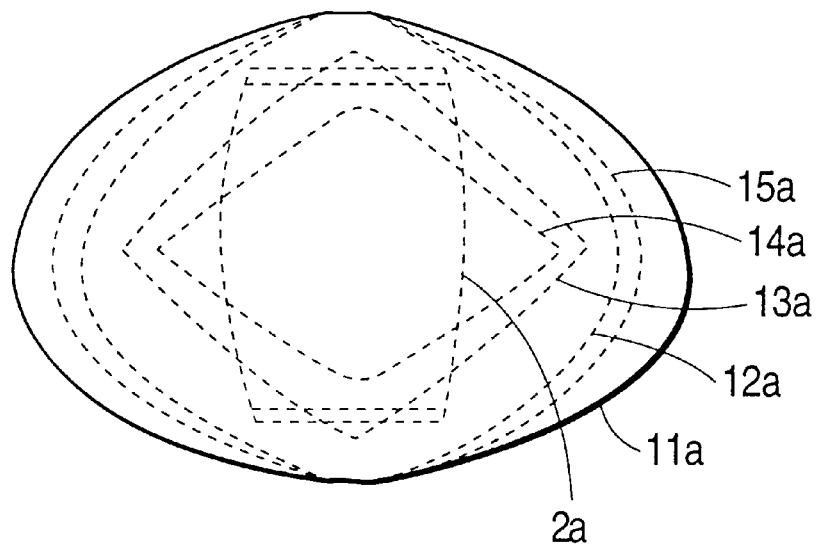
FIG. 8 (A) is a plan view wherein each material of the pad is overlapped.

As shown in FIG. 8(A), continuous pad materials 11a, 12a, 13a, 14a, and 15a, and continuous pouch-like body 2a are overlapped so that the symmetrical centers can be aligned. In this embodiment, two pieces of continuous pad material 11a and 12a are designed to come over the continuous pouch-like body 2a. Three continuous pad materials 13a, 14a, and 14a are designed to layer under the continuous pouch-like body 2a. However, these positions can be suitably changed depending on the position which the shape memory material 3 is placed.

Figure 8B:
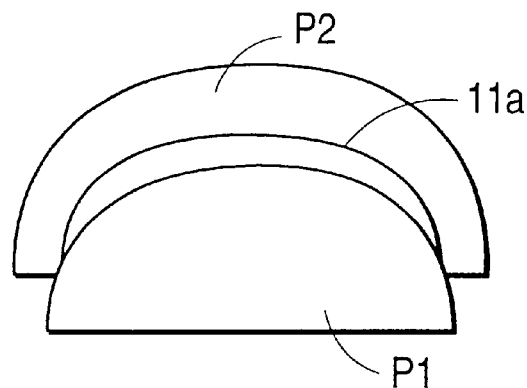

Then, the overlapped continuous pad materials 11a, 12a, 13a, 14a, and 15a, and the continuous pouch-like body 2a are bonded and provided with shape. In particular, an adhesive is applied to at least the continuous pad materials 11a, 12a, 13a, 14a, and 15a, which are vertically layered, or top the continuous pouch-like body 2a (this adhesive application should be done prior to overlapping). As shown in FIG. 8(b), the overlapped continuous pad materials 11a, 12a, 13a, 14a, 15a, and the continuous pouch-like body 2a (in FIG. 8(b), marks are represented by only 11a) are placed on the press stand p1. On the press stand p1, they are pressed with the press die and steam is injected. The heat of steam causes each material to be formed into a curved shape and to bond to each other b y the adhesive. However, the adhesive is not applied between the continuous sheet-like bodies 21a and 22a forming the continuous pouch-like body 2a, and they are not bonded to each other. However, marks for positioning can be provided for each material, so that the positions of continuous pad materials 11a, 12a, 13a, 14a, and 15a, and the continuous pouch-like body 2a may be precisely aligned; or they can be fitted so as not to cause a difference.

Figure 8C:
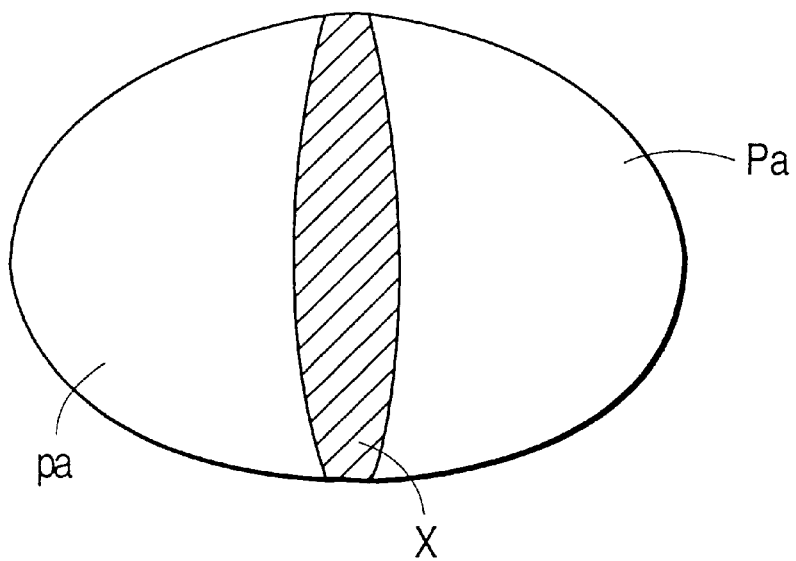

The continuous pad materials 11a, 12a, 13a, 14a, and 15a and the continuous pouch-like body 2a, which are overlapped and bonded, will be cut to make a symmetrical pair of pad members pa, pa (this pad is a pad of the present invention, but the shape memory material 3 has not been inserted). The cut surface of the end forms the shoulder tip k1, and the pad member, which has the end surface of the shoulder tip k1 is clearly perfect, can be produced, while the opening 4 is formed in the pouch-like body 2 on the end surface of the shoulder pad k1. However, a part x to be discarded after cutting is shown with a shaded portion in FIG. 8 (C) and FIG. 6.

After the pad members pa, pa have been formed, the shape memory material 3 is inserted from the opening 4 and fixed by sewing or the like to complete the pad containing the shape memory material. In this case, as shown in FIG. 3 (A) and FIG. 4, the engagement parts 7, 7 can be provided. The engagement part 7 is formed forward of the positioning part 5 of the ends of the pouch-like body. One end of the shape memory material 3 is inserted between the engagement 7 and the positioning part 5; and then, the other part of the shape memory material 3 is inserted between the engagement part 7 and the positioning part 5. This insertion makes the positions of the ends of the shape memory material 3 more precise. Moreover, when the other end is inserted after one end of the shape memory material 3, the position of the end, which has been inserted, can be prevented from moving.

This engagement part 7 can be formed by sewing sheet-like bodies 21, 22 to each other, but the sheet-like bodies 21, 21 can be formed by other fixing means including bonding.

The interval of the engagement parts 7, 7 is set shorter than the length of the long continuous shape memory material 3. The length should be one-half times as the length of the long continuous shape memory material 3, but even if the length is shorter, when the shape memory material can be curved or distorted, or when the shape memory material can be long enough to be inclinedly inserted, there are no adverse affects.

The pad of this invention can be made by another method: for example, right and left pads are separately made. Pad materials except the pouch-like material is previously layered, and then the pouch-like body is inserted among the pad materials. Moreover, in the embodiment described above, although the positioning part 5 is formed along the outward line of the pouch-like body 2, the shape of the positioning part 5 and the shape of the pouch-like body 2 may not always correspond, but the shape of the pouch-like body 2 may greatly extend outside the positioning part 5. In particular, the entire size of the pouch-like body 2 can be made as large as the size of the entire pad (i.e. the same size as the pad material 11) to form the positioning part 5 on a suitable place.

The opening 4 of the pouch-like body 2 is provided at the edge of the shoulder tip side of the shoulder pad 1, but it may be provided at another position (along the line extending from the ends of the long continuous shape memory material). In the embodiment described above, the pouch-like body 2 is previously inserted and positioned in the pad prior to inserting the shape memory material 3, but the shape memory material 3 can be previously inserted into the pouch-like body 2, which may be positioned in the pad. In forming the pouch-like body 2, the shape memory material 3 can be pre-positioned, so that, with the shape memory material put between the sheet-like bodies 21, 22, they can be sewn to complete the pouch-like body 2. However, for the embodiment stated above, it is more advantageous for the pouch-like body 2 to be pre-positioned in the pad before the shape memory material 3 inserted, because the work before the insertion of the shape memory material 3 can be conducted in a flat manner, judging from the workability. However, the pad for the present invention is not limited to the shoulder pad and can be embodied as another pad including a breast pad.

The first invention in the present application provides a pad wherein the arrangement of the shape memory material can be effectively and precisely positioned, and good productivity can be obtained, by using a pouch-like body.

The second invention provides a pad wherein the position of the shape memory material can be more precise by using the positioning part in the pouch-like body, in addition to the structure of the first invention above.

The third invention provides a pad wherein the shape memory material can be positioned in the pouch-like body by inserting the long continuous shape memory materials from the opening, and wherein the leading end of the long continuous shape memory material is prevented from accidentally protruding when wearing clothes with the pads by positioning the opening except the line extending from the ends of the long continuous shape memory material.

The fourth invention provides a pad wherein the opening can be widely opened, wherein the shape memory material can be positioned by precisely positioning. When the curved shape memory material is positioned in the curved pad, good productivity can be obtained.

The fifth invention provides a pad wherein the shape memory material can be precisely positioned with stability, in addition to the effect of the third or fourth invention.

The sixth invention provides a pad wherein the shape memory material can be prevented from protruding the pad, and the safety of the pad can be enhanced.

The seventh invention provides a pad in which the shape memory material can be prevented from protruding and the safety of the pad can be further enhanced, in addition to the effect of the sixth invention.

The eighth invention provides a pad, in particular, an ideal pad as a shoulder pad used for clothes including a school uniform and a blazer wherein the shape memory material can be positioned by precisely positioning. When the curved shape memory material is positioned in the curved pad, good productivity can be obtained.

The ninth invention provides a pad in which the shape memory material can be prevented from protruding and the stability of the pad can be further enhanced, in addition to the effect of the eighth invention.

The tenth invention provides a manufacturing method of a pad by which the pad according to each invention can be mass-produced under good productivity.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

I claim:

1. A pad with shape memory comprising:

a plurality of flexible fiber pad materials;

a first sheet body with a first perimeter and a first area;

a second sheet body with a second perimeter and a second area, said first and second sheet bodies are disposed between said plurality of fiber pad materials;

means for connecting a substantial portion of said first perimeter to said second perimeter;

an aperture formed by portions of said first perimeter spaced apart from said second perimeter;

a pouch portion formed between said first sheet and said second sheet and communicating with said aperture; and a body thermosensitive shape memory material has a third area and is disposed between said first and second sheet bodies in said pouch portion, said shape memory material contacts said means for connecting, said means for connecting limits movement of said shape memory material, said first and second areas are substantially larger than said third area, whereby said means for connecting and said pouch portion with said shape memory material properly position said pad on a body of a wearer while said means for connecting substantially reduces penetration of said shape memory material through said first and second sheet bodies.

2. The pad with shape memory according to claim 1, wherein said means for connecting includes at least one of intermittent sewn thread, continuous sewn thread, adhesives, metal fasteners, and folding said first sheet body with said second body.

3. The pad with shape memory according to claim 1, wherein said flexible fiber pad materials include at least one of non-woven fabrics, textures, knits, cottons, and flexible synthetic resins.

4. The pad with shape memory according to claim 1, wherein said first and second sheet bodies include at least one of smooth woven fabrics, sailcloth, and denim.

5. The pad with shape memory according to claim 1, wherein said shape memory material includes at least one of alloys and resins.

6. The pad with shape memory according to claim 5, wherein said shape memory material has a first and a second end, said shape memory material further includes a synthetic resin cap disposed on each end thereof.

7. The pad with shape memory according to claim 6, wherein said shape memory material has a rectilinear shape.

8. The pad with shape memory according to claim 1, wherein said flexible fiber pad materials and said first and second sheet bodies have a shoulder shape of a human body.

9. A method of manufacturing a pad with shape memory, the method comprising the steps of:

providing a body thermosensitive shape memory material;

providing a plurality of flexible fiber pad materials;

providing a first sheet body with a first perimeter and a first area;

providing a second sheet body with a second perimeter and a second area;

placing the plurality of flexible fiber pad materials and said first and second sheet bodies in a stacked arrangement;

placing said first and second sheet bodies between said plurality of fiber pad materials;

connecting a substantial portion of said first perimeter to said second perimeter to form a pouch portion;

forming an aperture which communicates with said pouch portion by spacing a portion of said first perimeter spaced apart from said second perimeter; and placing said shape memory material in said pouch portion, wherein the connection between the first perimeter and second perimeter and said pouch portion with said shape memory material properly positions said pad on a body of a wearer while the connection between the first perimeter and second perimeter substantially reduces penetration of said shape memory material through said first and second sheet bodies.

10. The method of manufacturing a pad with shape memory according to claim 9, further comprising the steps of:

applying an adhesive to each pad material of said plurality of the flexible fiber pad materials;

pressing said plurality of flexible fiber pad materials with a press die; and heating said plurality of flexible fiber pad materials with steam.

11. The method of manufacturing a pad with shape memory according to claim 9, further comprising the step of cutting the plurality of flexible fiber materials into a plurality of equally sized portions.

12. The method of manufacturing a pad with shape memory according to claim 9, wherein said connecting step further includes sewing thread between said first and second sheet bodies.

13. The method of manufacturing a pad with shape memory according to claim 9, wherein said connecting step further includes folding portions of said first and second sheet bodies one upon another and sewing the folded portions together.

14. The method of manufacturing a pad with shape memory according to claim 9, further comprising the step of providing said shape memory material with synthetic resin caps disposed on each end thereof.

15. The method of manufacturing a pad with shape memory according to claim 9, further comprising the step of shaping said flexible fiber pad materials, said first and second sheet bodies, and said shape memory material into a shoulder shape of a human body.

* * * * *